Jan. 8, 1957 E. LOCATELLI 2,777,124
APPARATUS FOR PROCESSING INDIVIDUAL CHEESE RATIONS
Filed Nov. 10, 1953 2 Sheets-Sheet 2

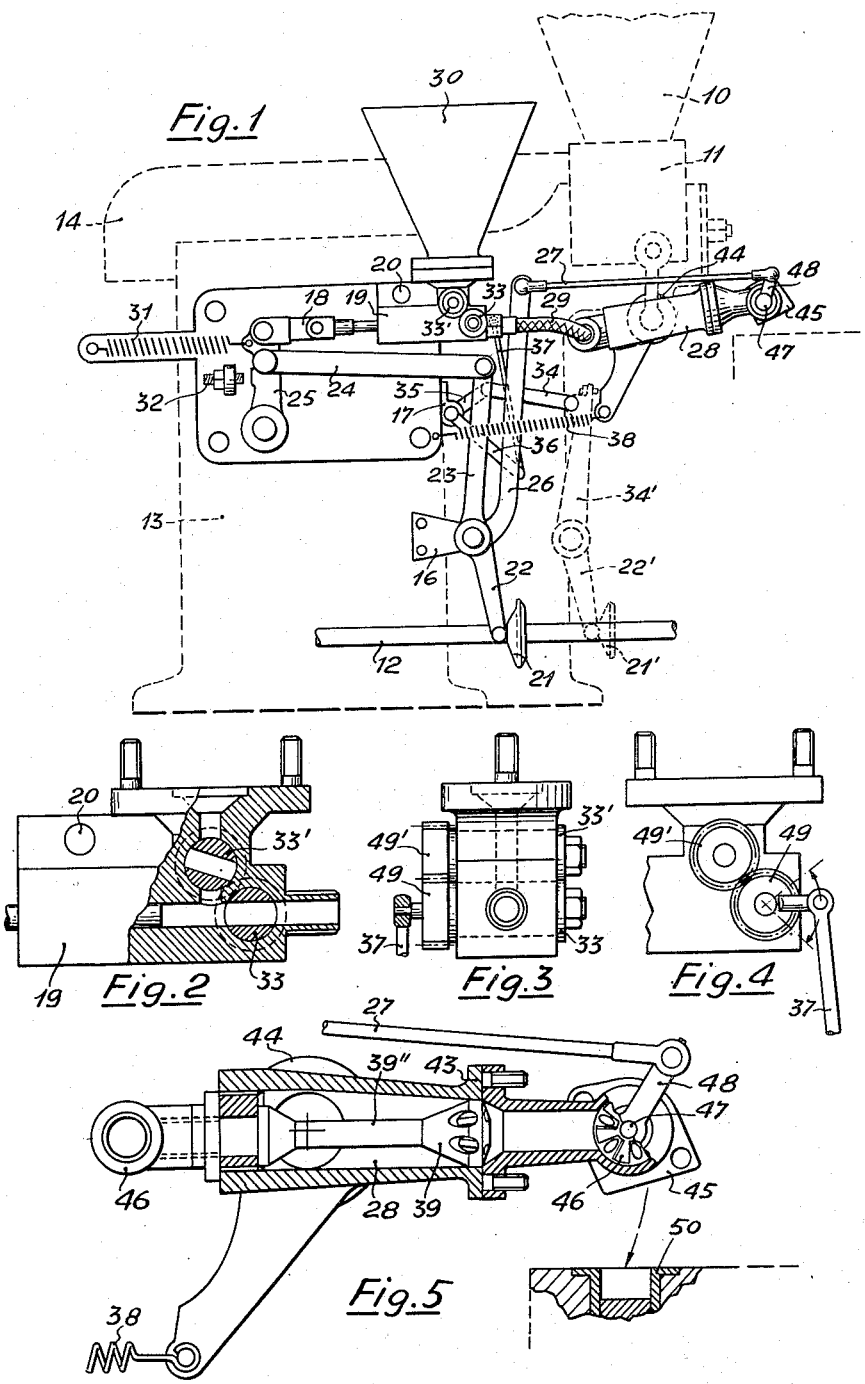

United States Patent Office 2,777,124
Patented Jan. 8, 1957

2,777,124

APPARATUS FOR PROCESSING INDIVIDUAL CHEESE RATIONS

Ercole Locatelli, Robbio, Lomellina, Italy

Application November 10, 1953, Serial No. 391,330

Claims priority, application Italy January 28, 1953

3 Claims. (Cl. 99—243)

This invention relates to devices for processing individual cheese rations, and more particularly to devices for interspersing selected green moulds and for creating streaks in individually packed rations of cheese.

The production of fused cheeses prepared as individual rations (sectors, cubes, parallelepipedons etc.) by the use of conventional dosing-packing machines does not permit the reproducing, in the interior of the paste of such single rations, of either the texture of the moulds or of the streaks typical in mouldy cheeses (Gorgonzola, Roquefort, bleu cheese and so forth).

During the last twenty years, many attempts have been made to incorporate moulds in small size fused cheeses, but to date it has been possible to prepare only large mould-interspersed fused cheese blocks and forms, mostly by manual processes whose difficulty and high cost increase appreciably with the decrease of the size of the blocks or rations to be prepared.

Besides, the manual confection and preparation of fused mould-interspersed cheeses are insufficiently hygienic and introduce contamination, rendering such products less preservable and more prone to spoiling.

Fused mould-interspersed cheeses, whose preparation cannot be carried out with conventional automatic dosing-packing machines, have unfortunately therefore been excluded from the advantages of mechanical production.

Attempts have been made to prepare small mould-interspersed cheeses by fusing hand made mould-interspersed cheeses, but as a result a fused cheese was obtained having a more or less uniformly dark paste and being unsalable on account of the dispersion of the blue-green moulds constituting the characteristics interspersed moulding of the cheese before fusing. Attempts have also been made to add green mold in minute fragments to the paste introduced into the hopper of the dosing-packing machine, but the results were very nearly equal to the above indicated results on account of the dispersion of the mould through the paste of the fused hot cheese subjected to the necessary stirring.

Similar difficulties and inconveniencies appear in the preparation of all of those products (edible or not) in which it should be desirable to provide streaks or filaments formed with differently colored matters easily soluble or dispersible in the mass of the product to be dosed and packed.

The above mentioned difficulties and inconveniencies have been surmounted and solved for the first time by apparatus according to the present invention, by which all contact with the surrounding air and operators' hands is avoided. This is accomplished by means of injections of filaments of the colored substance with suitable mechanical means contained in the dosing-packing machine itself, within the very body of the paste to be mould-interspersed or streaked, at the moment when the mixing and heat action of the dosing apparatus is at the point of ceasing, in order to prevent the matter used for interspersing or streaking from being dispersed through the product being prepared.

Said process has been realized with the new machine for mould-interspersing small ration cheeses illustrated by way of example in the annexed drawings, in which:

Fig. 1 is an assembly of the apparatus as applied to a conventional dosing-packing machine (schematically represented with dotted lines).

Fig. 2 is an enlarged particular of the dosing block viewed from the side and partially sectioned to show the rotating cylinders acting as dosing valves.

Fig. 3 is a front view of the block of Fig. 2.

Fig. 4 shows the same particular as Fig. 2, but not sectioned with a view of the gear couple and lever.

Fig. 5 is an enlarged longitudinal section of the conveying cylinder with the injector and the cutting off device applicable to the outlet of the machine.

Figure 6:
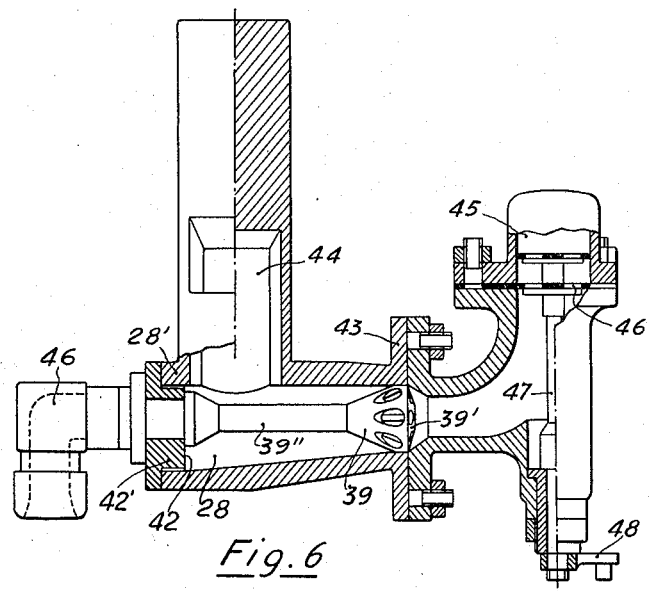
Fig. 6 is a horizontal section according to line VI—VI of Fig. 5.
Figure 7:
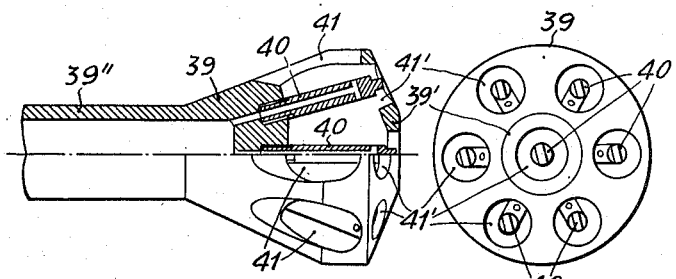
Fig. 7 shows a side view of the enlarged and partially sectioned injector head.
Figure 8:
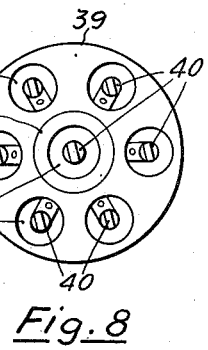
Fig. 8 is a front view of Fig. 7.

In Fig. 1 is pictured in doted lines the outline of one of the conventional types of fused ration cheese dosing-packing machines. In it are to be noticed: the funnel 10 into which the fused cheese is introduced, and the underlying cheese doser 11; the basement 13 carrying a motor group (not represented) and the upper part 14, not pertinent to the present invention; from the driving shaft 12 of the packaging machine, the drive of the new device to be hereafter described is derived.

As is known, the quantity of predetermined cheese paste for each ration comes out of the doser through a tube ending in a bill, with a rhythmical movement, synchronized with the movement of the nonrepresented underlying packaging device. In Fig. 1 there has been represented with full lines the new apparatus applied to the dosing-confectioning machine whose outline is represented by dotted lines.

The injector of the colored paste, that in this case consists of mould containing paste for effecting the mould-interspersion of the cheese paste, is applied to base 13 of the machine by means of a plate 15 and supports 16 and 17 for the levers and control bars.

The apparatus comprises a suction and force pump 18—19 fixed to the supporting plate by a bolt 20. An excentric 21, deriving its movement from the driving shaft 12 of the packaging machine, operates a group of levers and links 22—23—24—25 and 26—27. The former operate the force stroke of piston 18. Excentric 21 is so adjusted that the pump 19 force stroke is synchronized with the expulsion of the dose of paste to be confectioned from the doser 11 into the underlying discharge chamber 28. The piston contained in the pump cylinder 19 pushes into flexible tube 29 connected with discharge chamber 28 the colored matter or mould-containing paste precedingly sucked from funnel 30. The suction phase of the piston is determined by a strong recall spring 31. A micrometrical screw 32 determines the length of the piston stroke, that is, practically the quantity of colored matter or mouldy paste that is to be pushed at each stroke into the flexible tube 29. Recalling of the coloring matter or mouldy paste fed into the flexible tube is prevented during the suction stroke of the piston, by a couple of valves constituted by two rotating cylinders 33—33' (Figs. 2 to 4), each of which is integral with a toothed wheel 49—49' respectively, which wheels mesh with each other and are driven by connecting rods 37—36—35—34, 34', 22', which latter is actuated by cam 21'. The body of valve 33 is open during the force stroke and closed during the suction stroke. The movement of rods 22', 34'—34, 35, 36, 37 is suitably synchronized with the movement of the piston of pump 19 and is recalled by a strong spring 38.

In the discharge chamber 28 is inserted a hollow mushroom injection head 39 provided respectively with front and side apertures 41 and 41' traversed by a series of capillary divergent nozzles 40, and opening to the rear of the front surface 39', each one being in correspondence with an opening 41'.

The injection head 39 is located at the end of a hollow stem 39" having a substantially smaller diameter than the tubular discharge chamber 28, in order not to hinder the paste coming from the doser from flowing through it.

The ends of said cylindrical stem 39" are enlarged and calibrated to hole 42 made in the elbow 28' of the discharge chamber 28 so as to perfectly fill it, with the help of an axially bored screw plug 42, while the front one comprising in its head or mushroom 39 a truncated cone band is a water tight fit into a truncated cone throttled portion of the flanged end 43 of x chamber 28, so that the paste coming through conduit 44 of doser 11 is compelled to flow toward the discharge bill 45 by passing through holes 41—41' of the said truncated-cone and hollow head 39.

Cylindrical stem 39" is connected at its back through screw plug 42' and elbow fitting 46 with the flexible feed tube 29.

For interrupting the flow of the colored filaments coming from funnel 30, pump 19 and flexible tube 29 through the injector through nozzles 40, in the bill 45 of the discharge tube 28 of the doser, a sector shaped cut-off 46 is inserted whose shaft 47 is operated by the lever group 22—26—27—48 driven by eccentric 21.

The machine operates as follows:

While the doser 11 pushes the ration of dosed paste into the discharge tube 28, forcing it to pass through holes 41 in the truncated cone side wall of head 39 of the pump and to wind itself around the small tubes 40 disposed in the said holes, a plurality of continuous filaments of coloring matter or mould containing paste, comes out, synchronously, pressed by the pump, and penetrates into the body of each one of the paste cylinders formed while the paste passes through said front holes 41'. The paste then recomposes itself into a single stream at the exit from said holes 41', continuing to press toward the outside and passes through the sectors of cut-off 46, which by their rotary movement, cut the continuity of the colored filaments crosswise. The paste ration thus mechanically mould - interspersed and streaked, is immediately deposed into the packing device 50 where it hardens and is wrapped in tin or aluminum foil or other material.

Although the constructional example has been given for the mould-interspersion of small size cheese portions, it is clear that the apparatus can be used for other processings and that to its execution and operation particular modifications may be made provided that they are maintained within the ambit of the invention.

What I claim is:

1. An apparatus for processing food substance for interspersing moulds and forming streaks in individual ration confectioned products and especially fused cheeses, n conventional dosing and packaging machines, comprising a first feed recipient for the cheese paste and a second feed recipient for the coloured substance, a pump for intermittently sucking the coloured substance from the first recipient, two coaxial conduits, the outer of said coaxial conduits being used for the cheese fed by the second recipient, the inner of said coaxial conduits being used for the colored substance, a tapered part with a truncated cone form included by the outer of said coaxial conduits, a truncated conical head fitting in said tapered part and included by the inner of said coaxial conduits, peripheral ports located in the lateral wall and in the greater base of said truncated conical head for the cheese paste, internal nozzles included by said truncated conical head for the colored substance, outlet narrower chamber for uniting veins of food substance coming out from the truncated conical head, a cut-off device for slitting pieces of cheese, a pair of linkages, and cams actuating said pair of linkages for synchronizing the movement of the pump with the feeding of the cheese paste and the delivery of pieces of cheese with colored threads.

2. Apparatus as claimed in claim 1 comprising a two-valve device inserted between the second feed recipient for the colored substance and the pump with two toothed wheels in mesh with each other and angularly displaced by 90° by the effect of a crank connected to one of the links actuated by a common synchronized operating cam.

3. Apparatus as claimed in claim 1 wherein the nozzles for the colored substance comprise a tube disposed axially in relation to the ports of the greater base of the cone, said tube being closed at the top and having two opposite outlet bores at right angles to said tube, the outlet bores being connected to the internal cavity of the head, which is filled with the cheese paste passing through.

References Cited in the file of this patent

UNITED STATES PATENTS

| | | |
|---|---|---|
| 2,313,060 | Friedman | Mar. 9, 1943 |
| 2,649,744 | Elwell | Aug. 25, 1953 |